(12) United States Patent
    Hancock et al.

(10) Patent No.: US 9,025,514 B2
(45) Date of Patent: *May 5, 2015

(54) NETWORK SELECTION

(75) Inventors: Robert Hancock, Southampton (GB);
    Eleanor Hepworth, Hampshire (GB);
    Stephen McCann, Southampton (GB);
    Andrew McDonald, Romsey (GB)

(73) Assignee: Nokia Solutions and Networks GmbH & Co. KG, Munich, DE (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/601,859

(22) Filed: Aug. 31, 2012

(65) Prior Publication Data
    US 2013/0064222 A1    Mar. 14, 2013

Related U.S. Application Data

(63) Continuation of application No. 12/308,805, filed as application No. PCT/GB2007/050344 on Jun. 19, 2007, now Pat. No. 8,270,409.

(30) Foreign Application Priority Data

Jun. 23, 2006 (GB) .................................. 0612438.2
Dec. 20, 2006 (GB) .................................. 0625367.8

(51) Int. Cl.
    *H04L 12/28*    (2006.01)
    *H04W 48/18*   (2009.01)
    *H04L 12/66*    (2006.01)

(52) U.S. Cl.
    CPC ............... *H04W 48/18* (2013.01); *H04L 12/66* (2013.01)

(58) Field of Classification Search
    USPC ......................................... 370/315; 455/436
    See application file for complete search history.

(56) References Cited

U.S. PATENT DOCUMENTS

| 6,360,264 | B1 | 3/2002  | Rom              |
| 6,917,804 | B2 | 7/2005  | Takayama et al.  |
| 7,266,374 | B2 | 9/2007  | Kim              |
| 7,433,701 | B1 | 10/2008 | Jagadeesan et al.|

(Continued)

FOREIGN PATENT DOCUMENTS

| EP | 1 278 389 A1 | 1/2003 |
| EP | 1 418 711 A2 | 5/2004 |

(Continued)

OTHER PUBLICATIONS

International Search Report for PCT/GB2007/050344; mailed Dec. 17, 2007.

(Continued)

*Primary Examiner* — Kenny Lin

(57) ABSTRACT

A wireless user device, in radio communication with a first access point of one or more networks with which it could communicate via at least one of a plurality of access points, sends a network selection request to the first access point. If the network wishes to initiate a response from another access point in the same or another network, the first access point forwards the network selection request to one or more neighboring access points, in the same or another network. If any of the neighboring access points is able to communicate with the user device, that neighboring access point sends a response directly to the wireless user device and the wireless user device chooses the most suitable network from the responses sent.

14 Claims, 2 Drawing Sheets

(56) References Cited

U.S. PATENT DOCUMENTS

| | | |
|---|---|---|
| 7,656,841 B2 * | 2/2010 | Brouet et al. ............... 370/331 |
| 2002/0085719 A1 | 7/2002 | Crosbie |
| 2004/0166868 A1 * | 8/2004 | Backes et al. ............... 455/450 |
| 2005/0020262 A1 | 1/2005 | Kim |
| 2005/0060319 A1 | 3/2005 | Douglas et al. |
| 2005/0198318 A1 | 9/2005 | von Mueller et al. |
| 2006/0025158 A1 | 2/2006 | Leblanc et al. |
| 2006/0068788 A1 | 3/2006 | Zivkovic |
| 2006/0092888 A1 * | 5/2006 | Jeong et al. ............... 370/338 |
| 2006/0133320 A1 | 6/2006 | Kim et al. |
| 2006/0135066 A1 | 6/2006 | Banerjea |
| 2007/0002819 A1 * | 1/2007 | Sood et al. ............... 370/348 |
| 2007/0025486 A1 * | 2/2007 | Gainey et al. ............... 375/356 |
| 2007/0047480 A1 | 3/2007 | Suga |
| 2007/0047492 A1 | 3/2007 | Kim et al. |
| 2007/0053362 A1 | 3/2007 | Garg |
| 2007/0190974 A1 * | 8/2007 | Zhang ............... 455/411 |
| 2010/0110921 A1 * | 5/2010 | Famolari et al. ............... 370/252 |
| 2011/0103264 A1 | 5/2011 | Wentink |
| 2011/0182172 A1 * | 7/2011 | Kulkarni ............... 370/221 |

FOREIGN PATENT DOCUMENTS

| | | |
|---|---|---|
| EP | 1 521 403 | 4/2005 |
| EP | 1 524 806 | 4/2005 |
| EP | 1 675 424 A2 | 6/2006 |
| GB | 2 391 767 A1 | 2/2004 |
| GB | 0612438.2 | 6/2006 |
| GB | 0625367.8 | 12/2006 |
| JP | 2003-324449 | 11/2003 |
| RU | 2 277 762 C2 | 6/2006 |
| WO | 02/32179 A1 | 4/2002 |
| WO | 2005/027556 A1 | 3/2005 |
| WO | 2005/027557 A1 | 3/2005 |
| WO | 2005/027558 A1 | 3/2005 |
| WO | 2006/014063 A2 | 2/2006 |
| WO | 2006/017024 A2 | 2/2006 |
| WO | PCT/GB2007/050344 | 6/2007 |

OTHER PUBLICATIONS

Office Action for U.S. Appl. No. 12/308,805 mailed Jan. 10, 2012.
Notice of Allowance for U.S. Appl. No. 12/308,805 mailed May 16, 2012.
Draft Standard for Information Technology—Telecommunications and information exchange between systems—Local and metropolitan area network—Specific requirements Part 11: Wireless LAN Medium Access Control (MAC) and Physical Layer (PHY) specifications (Revision of IEEE Std 802.11-1999); IEEE P802.11-REVma™/D4.0; 2005; pp. i-xxxviii, 1-1026.
Draft Amendment to Standard for Information Technology—Telecommunications and Information Exchange Between Systems—LAN/MAN Specific Requirements—Part 11: Wireless Medium Access Control (MAC) and physical layer (PHY) specifications; IEEE P802.11k/D3.0, Oct. 2005; pp. i-ix, 1-141.
Information technology—Telecommunications and information exchange between systems—Local and metropolitan area networks—Specific requirements—Part 11: Wireless LAN Medium Access Control (MAC) and Physical Layer (PHY) Specifications; 1999; pp. i-xiv, 1-528.
U.S. Appl. No. 12/308,805, filed Aug. 17, 2009, Robert Hancock, Siemens Aktiengesellschaft.

* cited by examiner

NETWORK SELECTION

CROSS REFERENCE TO RELATED APPLICATIONS

This application is a continuation of U.S. application Ser. No. 12/308,805 filed Aug. 17, 2009, which is the U.S. national stage of International Application No. PCT/GB2007/050344, filed Jun. 19, 2007 and claims the benefit thereof. International Application PCT/GB2007/050344 claims the benefit of United Kingdom Application No. 0612438.2 filed on Jun. 23, 2006, and United Kingdom Application No. 0625367.8 filed on Dec. 20, 2006. The contents of all four applications are hereby incorporated by reference.

BACKGROUND

Described below is a method of network selection, in particular for wireless local area networks, such as IEEE 802.11. In a wireless environment with overlapping networks (i.e. network coverage is provided by more than one operator), a wireless terminal needs to choose a network access point, such as an Access Point (AP) or Base Station (BS), to handover to, if mobility within the system is required, or change to a different network if the one it is currently with cannot provide the service it requires. Current IEEE 802.11 wireless systems support the periodic broadcast, or probing of network identity, and other characteristics, that can be used by mobile terminals (MTs) to detect network coverage and to assess which access point they would like to connect to having made their network selection. However, it is not mandatory for access points to provide this information (unless responding to an information request directed explicitly towards their network identity), and indeed, in some cases they are configured not to reply, for security and radio resource reasons. Therefore, MTs may not be able to detect all available points of attachment in a certain area. In addition, the information provided in a beacon from the access point does not provide much information about the characteristics of the network to support network selection. Future standardization is expected to add some additional information about network provision within IEEE 802.11 (Task Group u). However, one of the current problems with these state of the art techniques is that many messages are required to complete a neighborhood scan, e.g. many IEEE 802.11 probe/response messages, together with possible re-tuning to scan all available channels. In the future IEEE 802.11y system, the number of channels may expand considerably and this current technique does not scale well in terms of the time taken to achieve the complete scan of all possible neighbors.

SUMMARY

In accordance with a first aspect, a method of network selection for a wireless user device in radio communication with a first access point of one or more networks, via at least one of a plurality of access points, the method comprising sending a network selection request from the wireless user device to the first access point; wherein if the network wishes to initiate a response from another access point in the same or another network, the first access point forwards the network selection request to one or more neighboring access points, in the same or another network; wherein if any of the neighboring access points is able to communicate with the user device, that neighboring boring access point sends a response directly to the wireless user device; and wherein the wireless user device chooses the most suitable network from the responses sent.

This addresses the problem of the number of messages involved in an expanded system, by allowing the wireless user device to communicate with a single access point with which it is already in radio communication, to carry out subsequent selection of a network. The access point either provides the required level of service, or forwards the requirements to other neighboring access points which reply to the wireless user device, only if they can satisfy the request. This way the number of messages from the user device is reduced and the user device may be able to obtain a service from an access point which is not immediately visible to it, due to restrictions having been placed on that access point, or the one which with the user device has a radio connection.

A token provided by the wireless user device may be attached to the network selection request before it is forwarded by the first access point to neighboring access point.

The network selection request may include requirements relating to the service that the wireless user device requires from any access point and its associated network.

This may include quality of service, available bandwidth, roaming information or cost. For example, if the user device wants to know of availability of resources for a voice or video call that it plans to make, or if it needs to handover because it is moving out of range and has a particular requirement, then the user device can specify the criteria relating to a preferred roaming partner, QoS, bandwidth and cost and receive a response from the access point which is best able to match these.

The associated network of the first access point may forward the network selection request to more than one neighboring access point, in the same or another network, simultaneously.

An access point that is able to communicate with the wireless user device may respond directly to the wireless user device indicating the level of support that is available from the associated network of the access point for the service request from the wireless user device.

The response may be delivered via a unicast or multicast message delivery method, and includes the token provided by the wireless user device in the initial request.

The wireless user device may be one of a laptop, a personal digital assistant, or any wireless device supporting the appropriate air interface.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE EXEMPLARY EMBODIMENT

Figure 1:
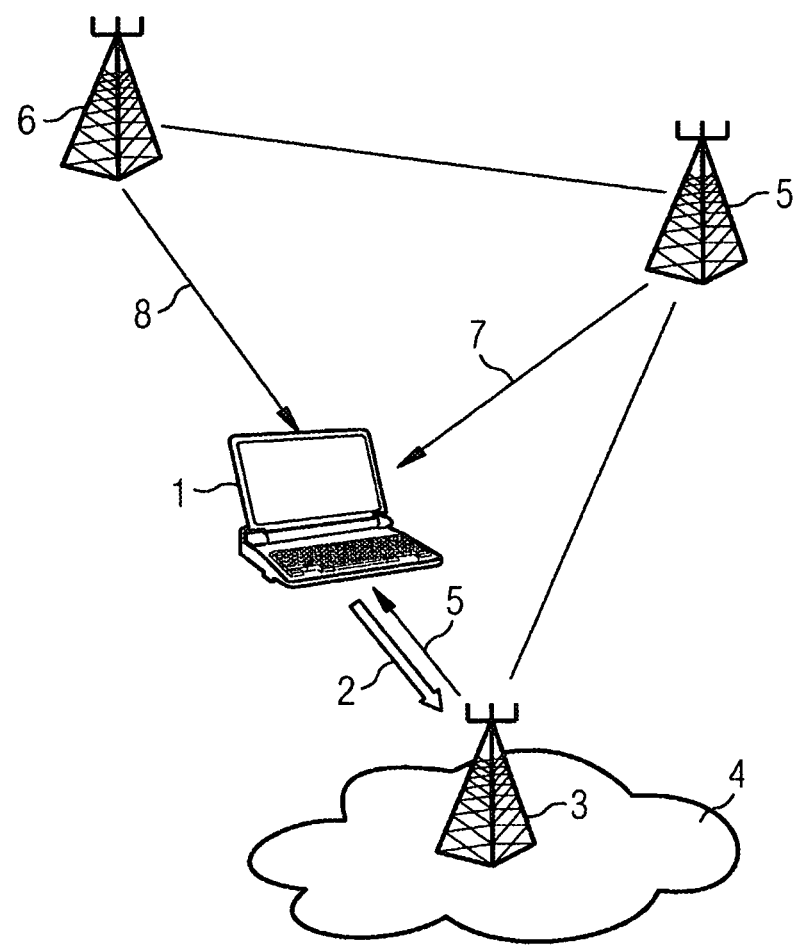
FIG. 1 is a pictorial diagram that illustrates a scenario showing the typical deployment of apparatus for carrying out the method.

Reference will now be made in detail to the exemplary embodiments, examples of which are illustrated in the accompanying drawings, wherein like reference numerals refer to like elements throughout.

Problems arise from user devices having to send large numbers of requests and receive corresponding responses over air, without any certainty that the access point with which the user device is communicating being able to provide the desired service. The user may have radio communication with the access point which had the strongest signal when the user device first switched on, or came within range, but that access point may be barred from the network which the user device needs, so the network request is passed on to another access point. Also, the wireless communications may be unreliable, giving rise to the possibility that these requests and/or responses may get lost during transmission. This procedures of request/response protocols to provide extra functionality in a more secure manner and to reduce the amount of over the air signalling for neighbor cell discovery.

Conventionally, a wireless user device has to transmit multiple messages, covering all the possible channels within all possible neighboring cells. Although this solves the problem of determining the most suitable network access point and cell, it is not an efficient mechanism, subject to long latencies and does not scale well. The potential for lost messages is addressed by repeating requests, which adds to the scaling problem.

The mechanism of the present invention allows the wireless device to send a message to its current access point, e.g. an AP, or BS, asking the access point to inform its neighbors whether the wireless device may possibly receive information from them directly. Typically, this is done through the reception of multicast frames. The wireless device attaches a unique token to this request, which is subsequently transmitted by any of the responding neighbor access points, enabling the original user device requesting the service to be identified and for the neighboring boring access point to respond to it directly, without sending messages back through the first access point. In this manner, a closed loop information exchange is established between the wireless device and its neighboring boring cells.

FIG. 1 shows a wireless device 1, or terminal, which transmits a request 2 to its current access point 3. This request 2 is processed by the network 4, which can be the same network for all 3 access points shown, or one or more of these access points may belong to a different network, and a response 5 may be transmitted through the access point 3, or neighboring boring access point 5, 6 using responses 7, 8, or indeed all three of them, if deemed necessary by the network.

Figure 2:
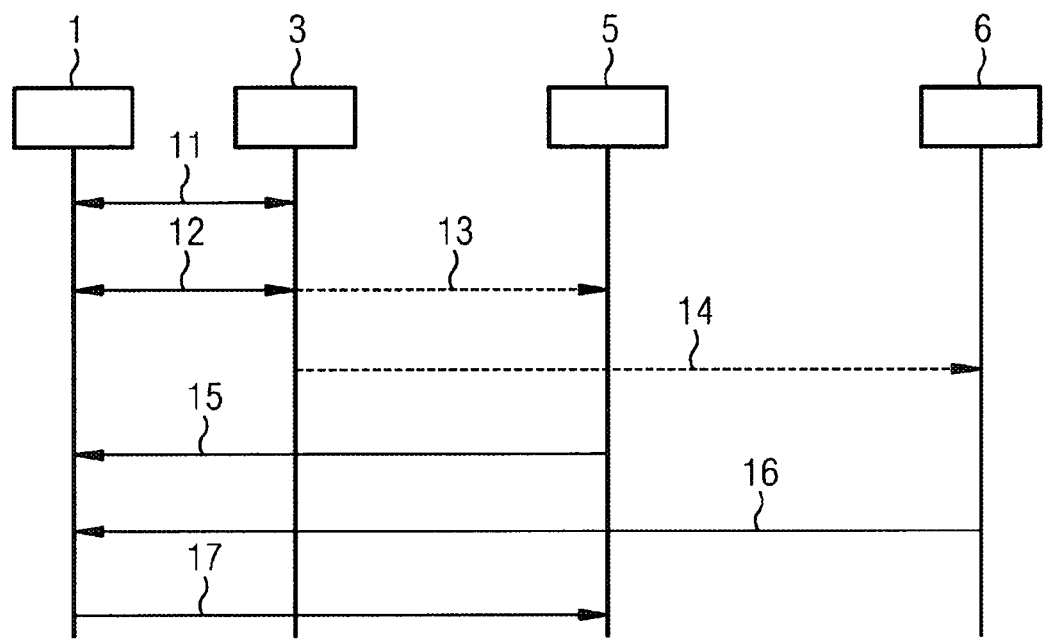
FIG. 2 is a data flow diagram that represents an example of a typical message flow between a wireless device and three access points using the method; and, FIGS. 3A and 3B are record layouts that respectively illustrate the format of typical request and response messages used in the method.
Figure 3A:
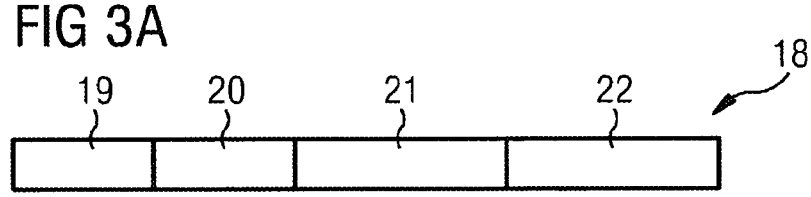
Figure 3B:
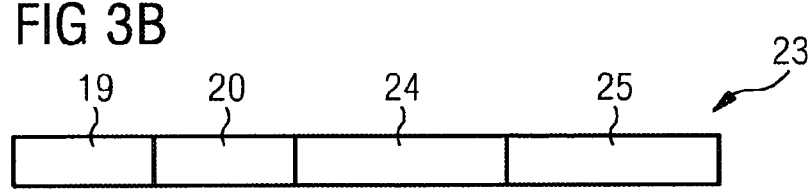

In FIG. 2, the message sequence is shown in more detail. The wireless device, or terminal 1 connects 11 in its usual manner to the access point 3, typically using key passing mechanisms, such as pairwise transient key (PTK) and group temporal key (GTK). The wireless device 1 transmits an inform message 12 to the access point 3, containing a locally generated unique token. FIG. 3a shows an example of the request 18 message content including the token and FIG. 3b shows the same for the response 23 message content. In the request message there is a header 19, token 20 and requests 21, 22 for information of type 1 and type 2. In the response message 23, again there is a header 19 and token 20, along with blocks 24, 25 with information of type 1 and type 2 respectively. The inform message is forwarded 13, 14 by the access point 3 to the access points 5, 6. If these access points 5, 6 decide that it is useful, or indeed possible, to transmit information back to the wireless device, they do so using either a unicast or multicast message 15, 16 including action or beacon and containing a suitable hash of the neighboring boring access point identity (#BSSID) in a particular network (SSID), together with the token, so that the wireless device 1 can correctly identity the message and determine the identity of that neighbor access point 5, 6. The terminal can then associate with its preferred AP 5 after getting back the information, using the same message format as for the original connection 11, but with a different base station identified from the access point identifier, BSSID and the network identifier, SSID. This invention provides a considerable advantage to the standardization of IEEE 802.11 equipment. An engineering solution which reduces the number of over the air signalling messages is regarded as a key advance in this area. It is important to be able to minimize the amount of signalling (especially broadcast) traffic to allow the radio resources to be used for data transfer. The consequence of this is that network and neighbor discovery latency times are reduced.

Additional functionality is provided to the system in two respects, firstly that closed group information is provided to the wireless terminal (i.e. information received may be based on its credentials); and secondly that closed group information is provided to the access points, allowing load balancing and filtering of traffic to the wireless device (i.e. policy control) and load balancing of existing wireless devices). Cross administrative domain information (e.g. cross IEEE 802.11 SSID information) can be passed and managed.

The network can also manage all the network access points within the potential pool, achieving load balancing which would not occur purely with neighborhood reports (e.g. IEEE 802.11k/802.11v).

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method of network selection for a wireless user device in radio communication with a first access point of a first network, different from the first network, the method comprising:

sending a network selection request, including an attached token provided by the wireless user device, from the wireless user device to the first access point;

receiving a response to the network selection request, including the attached token, from the first access point or directly from at least one neighboring access point, each in one of the first and second networks different from the first network, able to communicate with the wireless user device; and choosing by the wireless user device from among each response received, a communication network including an access point different from the first access point of the first network or a communication network different from the first network.

2. A method according to claim 1, wherein the network selection request includes requirements relating to a service the wireless user device would like to obtain from any access point and an associated network.

3. A method according to claim 2, wherein the response to the network selection request indicates a level of support that is available from the associated network for the service desired by the wireless user device.

4. A method according to claim 3, wherein the wireless user device is on of a laptop, a mobile phone and a wireless device supporting a wireless interface of the first access point.

5. The method of claim 1, wherein the response is received directly from the at least one neighboring access point and the choosing includes choosing the communication network including the access point different from the access point of the first network.

6. A wireless user device in radio communication with access points of at least one network, comprising:
- at least one wireless interface sending a network selection request, including an attached token provided by the wireless user device, to a first access point of a first network and receiving a response to the network selection request, including the attached token, from the first access point or directly from at least one neighboring access point, each in one of the first network and a second network different from the first network, able to communicate with the wireless user device; and
- at least one processor configured to choose from among each response received, a communication network including an access point different from the first access point of the first network or a communication network different from the first network.

7. A wireless user device according to claim 6, wherein the network selection request includes requirements relating to a service the wireless user device would like to obtain from any access point and an associated network.

8. A wireless user device according to claim 7, wherein the response to the network selection request indicates a level of support that is available from the associated network for the service desired by the wireless user device.

9. A wireless user device according to claim 8, wherein said wireless user device is on of a laptop, a mobile phone and a wireless device providing the at least one wireless interface for other devices.

10. The method of claim 6, wherein the response is received directly from the at least one neighboring access point and the at least one processor is configured to choose from among each response received the communication network including the access point different from the first access point of the first network.

11. A method of network selection for a wireless user device in radio communication with a first access point of a first network, via at least one second access point each on one of the first network and a second network different from the first network, that is able to communicate with the wireless user device, the method comprising:
- receiving, by the at least one second access point from the first access point, a network selection request, including an attached token provided by the wireless user device, initiating a response from the at least one second access point, each in one of the first network and the second network; and
- sending, from the at least one second access point, the response, including the attached token, directly to the wireless user device.

12. A method according to claim 11, further comprising initially receiving the network selection request from the wireless user device by the first access point.

13. A method according to claim 12, wherein the network selection request includes requirements relating to a service the wireless user device would like to obtain from any access point and an associated network.

14. A method according to claim 13, wherein the response to the network selection request indicates a level of support that is available from the associated network for the service desired by the wireless user device.

* * * * *

UNITED STATES PATENT AND TRADEMARK OFFICE
CERTIFICATE OF CORRECTION

| | | |
|---|---|---|
| PATENT NO. | : 9,025,514 B2 | Page 1 of 1 |
| APPLICATION NO. | : 13/601859 | |
| DATED | : May 5, 2015 | |
| INVENTOR(S) | : Robert Hancock et al. | |

It is certified that error appears in the above-identified patent and that said Letters Patent is hereby corrected as shown below:

In the Claims

In column 5, line 6, in claim 4, delete "on" and insert -- one --, therefor.

In column 6, line 2, in claim 9, delete "on" and insert -- one --, therefor.

In column 6, line 12, in claim 11, delete "on" and insert -- in --, therefor.

Signed and Sealed this
Sixth Day of October, 2015

Michelle K. Lee
*Director of the United States Patent and Trademark Office*